Patented Feb. 15, 1949

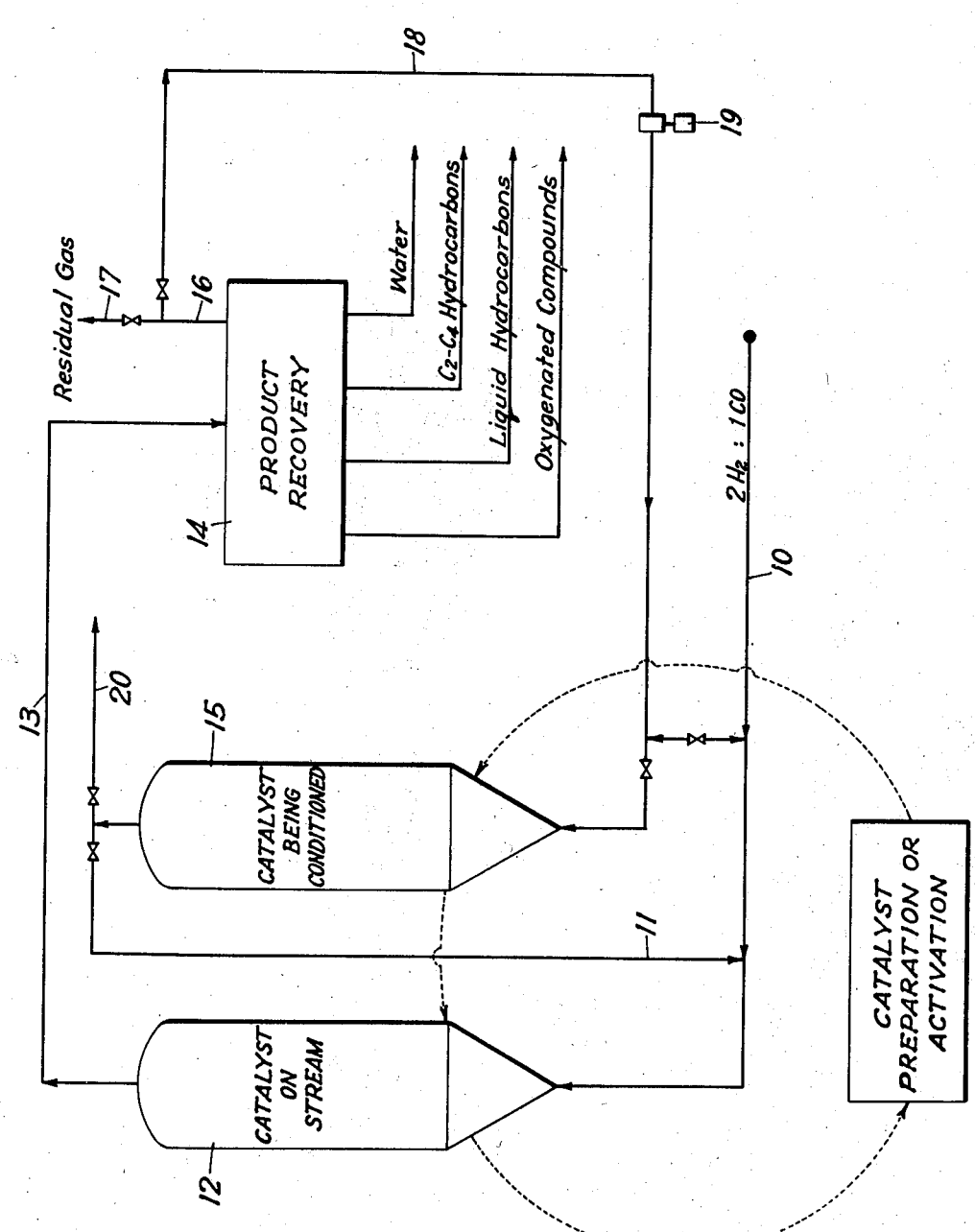

2,461,570

UNITED STATES PATENT OFFICE 2,461,570

SYNTHESIS OF LIQUIDS FROM CARBON MONOXIDE AND HYDROGEN

Joseph K. Roberts, Flossmoor, Ill., assignor to Standard Oil Company, Chicago, Ill., a corporation of Indiana Application May 3, 1947, Serial No. 745,744

9 Claims. (Cl. 260—449.6)

This invention relates to the synthesis of normally liquid products from carbon monoxide and hydrogen and it pertains more particularly to an improved method for producing liquid hydrocarbons and oxygenated organic compounds with synthesis catalysts, particularly with catalyst of the iron type.

An object of the invention is to provide a method and means whereby the synthesis reaction is directed toward the formation of desired products. With methane as a raw material it is desirable that the oxygen content of the carbon monoxide be converted into water instead of into carbon dioxide. For most purposes it is desirable to obtain normally liquid or condensible hydrocarbon products instead of methane. An object of the invention is to produce the maximum yield of hydrocarbons higher boiling than methane along with a certain amount of oxygenated compounds while minimizing excessive carbonaceous deposits on the synthesis catalyst and minimizing conversion of carbon monoxide to carbon dioxide.

A further object of the invention pertains particularly to synthesis with fluidized catalyst of small particle size. Many difficulties have been encountered in fluidized catalyst synthesis on account of catalyst defluidization, catalyst agglomeration, and decreases in catalytic activity. An object of my invention is to overcome such difficulties. A further object is to provide a method and means whereby synthesis of normally liquid products may be effected at a substantially constant high conversion level for a long period of time with the amount of synthesis gas introduced remaining substantially constant and the load on the fractionation and product recovery system likewise being substantially constant, i.e. not being materially affected by any change which inevitably takes place in the activity of the catalyst employed.

A further object is to provide a new and improved means for conditioning freshly prepared or activated synthesis catalyst and for simultaneously controlling the carbon monoxide content of gas charged to the main synthesis step. Other objects will be apparent as the detailed description of the invention proceeds.

With cobalt synthesis catalyst it has been found that the oxygen content of reacting synthesis gas is converted largely to water, that the synthesis products (other than water) are largely hydrocarbons with not appreciable amounts of oxygenated compounds and that best results are obtained by initially conditioning the catalyst with gas of low carbon monoxide content. With iron type catalysts and with charging stocks consisting essentially of a 2:1 hydrogen-carbon monoxide mixture, the product distribution is quite different in that a large amount of the oxygen is converted into carbon dioxide, a more highly olefinic hydrocarbon product is produced, a much larger proportion of oxygenated product is formed and there is a serious tendency toward catalyst defluidization after a very short time on-stream. It has been found that by diluting the synthesis gas charge with a gas rich in carbon dioxide and/or hydrogen so that the $H_2:CO:CO_2$ ratio is approximately 3:1:2 or within the range of about 2-6:1:1-3 and the carbon monoxide content is kept below about 15% and preferably of the order of about 10 to 12% by volume, the tendency toward defluidization is minimized and the reaction is directed toward the production of desired products. However, a freshly prepared or freshly reactivated iron catalyst which is highly active cannot be placed on stream with the optimum gas charge under the desired conversion conditions because the catalyst will tend to "wax up" (become coated with carbonaceous matter), agglomerate and/or defluidize. It has therefore been necessary to employ a long start-up procedure for conditioning the catalyst, using a charge gas initially almost free of carbon monoxide and gradually increasing the carbon monoxide content while temperatures and pressures are likewise increased and brought up to conversion conditions. This procedure of conditioning a fresh active catalyst has been highly disadvantageous in that it has required days and weeks of time during which the system does not function at designed capacity.

In accordance with my invention I employ at least two separate reactors and I condition freshly prepared or activated catalyst in one of these reactors with residual gas from the product recovery system. I may employ the off gases from this conditioning reactor as a diluent for the incoming synthesis gas stream for regulating the carbon monoxide content and the $H_2:CO:CO_2$ ratio. Thus when the properly diluted charge passes through the main on-stream reactor under conversion conditions, assuming that the catalyst in said reactor has been properly conditioned, substantially complete conversion of carbon monoxide is effected and the residual gas from the product recovery system, after removal of water, will be fairly rich in hydrogen but will contain only about 1% of carbon monoxide. A portion of this residual gas stream is ideal for conditioning freshly prepared or reactivated catalyst. The conditioning is accomplished in the other reaction chamber and the off gases from said other chamber may form the diluent for the externally introduced synthesis gas stream.

There is a tendency for the activity of the synthesis catalyst to decrease with time on stream so that the residual gas from the product recovery system will at first be substantially free from carbon monoxide and then will gradually contain more and more carbon monoxide. By employing this residual gas for conditioning active catalyst, the highly active catalyst is first treated with a gas of very low carbon monoxide content and it is thus rendered capable of handling more and more carbon monoxide as the carbon monoxide content of the residual gas increases. By the time the main synthesis catalyst requires reactivation, the conditioned catalyst is ready for use in the main synthesis step so that the process may be carried out continuously with a substantially constant load on the various parts of the system.

In some cases, particularly with cobalt catalyst, the effluent from the conditioning step may be discharged from the system and utilized for fuel or other purposes. When iron catalyst is employed and particularly when such catalyst is used in a fluidized condition, off gases from the conditioning step are used as a diluent for the incoming synthesis gas stream because the conditioning step effects conversion of the gradually increasing amounts of carbon monoxide and it thus enables the diluent gas to be employed at a substantially constant ratio without increasing the carbon monoxide content of the total synthesis gas charge above the desired amount which, as above stated, may be of the order of about 12%. Thus the conditioning step helps to control the composition of gases entering the synthesis step at the same time that it is preparing catalyst for use in the synthesis step.

The invention will be more clearly understood from the following detailed description of a specific example thereof read in conjunction with the accompanying drawing which is a schematic flow sheet diagrammatically illustrating the invention.

Although certain aspects of the invention are useful and beneficial in substantially all types of hydrogen-carbon monoxide syntheses with any and all types of synthesis catalysts and with any and all types of catalyst contact (fixed bed, moving bed, slurry operations, fluidized solids operations, etc.) the invention is particularly applicable and useful in synthesis operations employing iron type catalysts in fluidized condition. No novelty is claimed in catalyst compositions per se or in methods of contacting or temperature control or in methods of synthesis gas preparation or in methods of product separation; all of these are now well known to those skilled in the art and they require no further detailed description.

I prefer to obtain the fresh synthesis gas charge by partial combustion of methane (natural gas) with relatively pure oxygen at an outlet temperature of about 2200 to 2500° F. or more, using about .6 volume of oxygen per volume of methane whereby a gas charge can be obtained containing about 62% hydrogen and 33% carbon monoxide, the remainder (after water removal) being essentially carbon dioxide, methane, and nitrogen. The synthesis charge may however be produced by any known partial combustion or reforming methods and/or it may be produced from coal or other carbonaceous material by the water gas reaction or by any other method known to the art.

While certain aspects of the invention are beneficial with cobalt synthesis catalysts and in fact any and all synthesis catalysts known to the art, the invention is particularly directed to the use of iron type synthesis catalysts. The iron catalyst may be prepared in any known manner. For example, pure iron may be burned in a stream of oxygen, the oxide $(Fe_3O_4)$ may be fused, ground to desired particle size, reduced and used as such. Promoters may be added to the mass undergoing fusion such for example as a small amount of silica, alumina, titania or alkali metal. Iron catalyst of the type commercially used in the synthesis of ammonia has been found to be suitable for hydrocarbon synthesis from carbon monoxide and hydrogen. A relatively inexpensive catalyst may be prepared by admixing hematite $(Fe_2O_3)$ with about 2% or more of potassium carbonate, heating the mixture to a temperature upwards of 1000° C. to effect incipient fusing or sintering and to convert the iron oxide to $Fe_3O_4$, extracting excess potassium from the sintered mass with water so that only about .1 to 2%, e. g. about .5% of potassium will remain and reducing the $Fe_3O_4$ containing the residual potassium by treatment with hydrogen for a period of hours at a temperature of about 600 to 1200° F. Either after or before reduction the particles should be ground to desired particle size and when the catalyst is reduced after grinding it may be desirable to subject the catalyst to a sintering step in a hydrogen atmosphere at a temperature in the range of about 1100 to 1300° F. It appears that the active catalyst is a mixture of Fe and FeO and that in the conditioning step a portion thereof is converted to $Fe_2C$.

When the catalyst is used in a fluidized solids system its particle size should be chiefly in the range of 1 to 200 microns and should preferably be in the range of 2 to 100 microns. For optimum results the particles should be of indiscriminate or different sizes rather than uniformly sized. The bulk density of the compact catalyst particles may be from 100 to 150 pounds per cubic foot but when fluidized by the upward passage of gases at the rate of about .5 to 3 feet per second, preferably 1 to 2 feet per second, the fluidized density is below 90 pounds per cubic foot and may range from about 25 to 75 or of the order of about 50 pounds per cubic foot.

About 28,000,000 cubic feet per day of oxygen may be employed to effect partial combustion of about 50,000,000 cubic feet per day of methane (natural gas) to produce about 135,000,000 cubic feet per day of synthesis gas containing about 62% of hydrogen and 33% carbon monoxide. This gas after water scrubbing is introduced into the system through line 10 and admixed with a diluent gas from line 11 the composition of which may be about 20% hydrogen, 1% carbon monoxide, 35% carbon dioxide and the balance methane and higher boiling hydrocarbons along with unavoidable amounts of nitrogen. After dilution the total synthesis gas stream charged to synthesis reactor 12 may be approximately 400,000,000 cubic feet per day and its composition may be approximately 34% hydrogen, 12% carbon monoxide, 24% carbon dioxide and the balance methane (and higher hydrocarbons) with unavoidable amounts of nitrogen, etc. Generally speaking, the $H_2:CO:CO_2$ ratio should be about 2-6:1:1-3 and the product of mol per cent hydrogen multiplied by mol per cent carbon dioxide and divided by the square of mol per cent carbon monoxide should be in the range of about 3 to 9.

The reactor may be a cylindrical vessel approximately 25 feet in diameter and about 40 to 50 feet in height containing approximately 120 tons of iron catalyst. The reactor may be provided for internal cooling by heat exchange surfaces and/or the reaction temperature may be controlled in any other manner known to the art. The gaseous charge passes upwardly through the reactor at about 1 to 2 feet per second, e. g. about 1.5 feet per second under synthesis conversion conditions such for example as a temperature in the range of about 550 to 700° F. and a pressure in the range of about 150 to about 450 pounds per square inch, there being about 1 pound of iron catalyst (which has previously been conditioned) in the reactor for each 5 to 15 cubic feet per hour of carbon monoxide charged thereto. The catalyst is preferably retained in the reactor in suspended turbulent dense phase condition and internal cyclones may be employed for knocking back catalyst from the superimposed dilute phase or settling zone.

The gasiform effluent from the synthesis step leaves reactor 12 by conduit 13 which introduces it into a product recovery system 14. No invention is claimed in the product recovery system per se and any known means may be employed for separating normally liquid oxygenated compounds and hydrocarbons as well as most of the normally gaseous hydrocarbons higher boiling than methane from the residual gas stream. The residual gas will contain only a small amount of carbon monoxide which may be less than 1% at the beginning of an operation but which may increase to 4 or 5% or more as the catalyst in reactor 12 becomes more and more inactive.

In order to condition catalyst for use in synthesis reactor 12 freshly prepared or reactivated catalyst of high activity is introduced into reactor 15 at about the same time that reactor 12 starts operation with previously conditioned catalyst. A part of the residual gas which leaves the product recovery system through line 16 may be withdrawn from the system through line 17, but most or all of this residual gas is introduced by line 18 and compressor 19 into reactor 15 for conditioning the fresh, highly active catalyst, i. e. for forming the necessary amount of iron carbide and otherwise modifying the catalyst so that it can be used without defluidization or other difficulties with the type of charge introduced into reactor 12 and under the conditions prevailing therein. Reactor 15 may be substantially the same size and shape as reactor 12 although it may be of smaller dimensions. The vertical gas velocities for fluidization are substantially the same in the conditioning reactor 15 as in synthesis reactor 12. The pressure will be substantially the same or a little higher than that of reactor 12 and the temperature may be initially about 50° to 100° F. lower but may gradually build up to the temperature which prevails in reactor 12, which may be about 600° F.

At the beginning of the conditioning reaction the residual gas charged thereto will contain less than 3% and preferably less than 1% of carbon monoxide and may contain 20 to 30% of hydrogen so that it may be employed without danger of defluidization. As the percentage of carbon monoxide in the residual gas gradually increases due to decreased catalyst activity in reactor 12, the catalyst in reactor 15 is capable of handling the increased carbon monoxide content without becoming defluidized and thus the catalyst in reactor 15 gradually receives a charge containing more and more carbon monoxide so that when the catalyst in reactor 12 is too inactive for effective use, the catalyst in reactor 15 is ready to go on-stream with the regular total synthesis gas charge while another batch of fresh or reactivated catalyst of high activity starts to be conditioned.

In the drawing the course of the catalyst is indicated by dotted lines, the catalyst from reactor 15 passing to reactor 12, that from reactor 12 passing to a reactivation step (wherein the carbonaceous deposits may be removed by oxidation followed by reduction or by any other known means) and then from the reactivation or preparation step back to the condition step. The word "fresh" as applied to the catalyst designates catalyst which has been freshly prepared or reactivated to such an extent that it is highly active. Instead of physically transferring the catalyst, it may remain in the same vessel and the various streams may be rerouted to accomplish the same result. For example, in the two-reactor system illustrated the total diluted gas stream can be introduced into reactor 15 after its catalyst is conditioned and the effluent therefrom can be sent by line 13 to product recovery (by lines and connections not shown) while spent catalyst is removed from reactor 12 and replaced by active catalyst. After the brief interval required for such physical transfer the residual gas stream from line 18 will then pass through reactor 12 and the effluent from reactor 12 will dilute the incoming gas charged to reactor 15 which during this cycle is the synthesis reactor. It should be understood that more than two reactors may be employed and that various alternative piping and valve means may be used for effecting substantially uninterrupted flow through the system so that the load on the synthesis gas preparation unit and the load on the product recovery unit will remain substantially constant.

A part of the effluent from the reactor wherein the catalyst is being conditioned, e. g. reactor 15 as shown in the drawing, may be continuously removed through line 20 for use as fuel gas. When cobalt catalyst is employed, all of the gas may thus be removed because the incoming synthesis gas does not require dilution for directing the conversion toward desired product formation. The withdrawal of gas from line 20 instead of from line 17 is highly advantageous because the gas withdrawn from line 20 is usually higher in methane and/or hydrocarbon content and hence is characterized by a higher heating value. Carbon monoxide and hydrogen have heating values below 400 B.t.u. while methane has a heating value of approximately 1000 B.t.u. per 1000 cubic feet. Thus the gas withdrawn from line 20 even though it may contain appreciable amounts of nitrogen is characterized by a high heating value and low toxicity (due to its decreased carbon monoxide content) and it may be piped elsewhere and utilized as ordinary city gas. Alternatively the gas from line 20 may be scrubbed to remove carbon dioxide and water and then used for effecting hydrogenation, e. g. for hydrogenating the product fraction in the Diesel fuel boiling range with such catalysts such as palladium, nickel or the like.

When employing iron as the synthesis catalyst and particularly when employing a fluidized iron catalyst system as herein described the carbon monoxide content of the total gas stream entering the synthesis reactor should not exceed about 15% and should usually be about 8 to 12%. The externally produced synthesis gas must therefore be diluted and in accordance with my invention the effluent from the conditioning step may be employed as diluent gas. If the residual gas were employed as a diluent without passing through the conditioning step then the carbon monoxide content of the total mixture would gradually increase with decrease in catalyst activity in the synthesis step. The conditioning step, however, converts the gradually increasing amounts of carbon monoxide in the residual gas so that the effluent from the conditioning step is characterized by substantially constant and very low carbon monoxide content which is uniquely suitable as a diluent gas for the incoming gas mixture from the gas preparation step. In the preferred example herein described, about 2 volumes of gas from reactor 15 is introduced by conduit 11 for admixture with 1 volume of gas mixture introduced through line 10 but depending on particular catalysts and operating conditions this ratio may be varied from about 1:1 to 3:1.

The temperature in reactor 15, like that in reactor 12, may be controlled by any known means such as heat exchange surfaces within the reactor itself, the cycling of catalyst solids through external coolers or the cooling of introduced fluids. Such details and the specific arrangement of pipes, valves, compressors, etc. are not shown in detail in the drawing because such factors are well known to those skilled in the art. While I have disclosed a preferred embodiment of my invention it should be understood that it is by way of example rather than limitation since various alternative arrangements and operating procedures and conditions will be apparent from the above description to those skilled in the art.

I claim:

1. The method of effecting synthesis of normally liquid products from carbon monoxide and hydrogen which method comprises contacting a previously conditioned synthesis catalyst in a synthesis step with a hydrogen-carbon monoxide gas charge under synthesis conditions, separating from synthesis effluent both normally liquid products and a residual gas consisting essentially of hydrogen, carbon dioxide and light normally gaseous hydrocarbons with only a small amount of carbon monoxide, contacting a fresh active synthesis catalyst with at least a portion of said residual gas at a temperature and pressure for conditioning the catalyst, and periodically changing the contacting sequence by employing catalyst from the conditioning step in the synthesis step and adding other fresh active catalyst to the conditioning step.

2. The method of claim 1 which includes the step of withdrawing for external use at least a part of the effluent from the conditioning step.

3. The method of claim 1 which includes the step of introducing at least a part of the effluent from the conditioning step as a diluent to synthesis gas charged to the synthesis step.

4. The method of claim 1 in which the synthesis catalyst is an iron catalyst promoted by an alkali metal.

5. The method of claim 4 wherein the iron catalyst is characterized by a particle size in the range of 1 to 200 microns and wherein said catalyst is maintained in fluidized condition in the synthesis and conditioning steps by employing an upward gas velocity in each step in the range of .5 to 2 feet per second.

6. The method of effecting synthesis of normally liquid products from carbon monoxide and hydrogen which comprises continuously contacting an incoming hydrogen-carbon monoxide gas mixture diluted with a diluent gas with a previously conditioned iron type synthesis catalyst under synthesis conditions whereby the carbon monoxide is at first nearly all consumed in the synthesis reaction but gradually increases in the product stream as the catalyst becomes less active, separating effluent from the synthesis step to obtain both normally liquid products and a residual gas consisting chiefly of hydrogen, carbon dioxide and light normally gaseous hydrocarbons and which initially is substantially free from carbon monoxide but which contains more and more carbon monoxide as the reaction proceeds, contacting a fresh active catalyst with said residual gas under conditions of temperature and pressure to effect conditioning of said fresh catalyst and for consuming substantially all of the carbon monoxide content thereof, and utilizing at least a portion of the gas from said conditioning step as said diluent whereby the carbon monoxide content of the total gas stream entering the synthesis step is substantially constant regardless of increasing carbon monoxide content of the residual gas stream.

7. The method of claim 6 wherein the synthesis is effected at a temperature in the range of about 550 to 700° F. under pressure in the range of about 150 to 450 pounds per square inch and at a charge rate in the range of 5 to 15 cubic feet of carbon monoxide per hour per pound of iron catalyst employed in the synthesis step.

8. The method of claim 6 wherein the amount of diluent is so proportioned as to give a total gas charge to the synthesis step containing hydrogen, carbon monoxide and carbon dioxide in the ratio of about 2–6:1:1–3, containing a volume percent carbon monoxide in the range of about 8% to 15% and containing such proportions of hydrogen, carbon monoxide and carbon dioxide that the mol percent hydrogen multiplied by mol percent carbon dioxide and divided by the square of the mol percent carbon monoxide is within the range of about 3 to 9.

9. The method of effecting synthesis of normally liquid products from carbon monoxide and hydrogen which comprises contacting a carbon monoxide-hydrogen gas charge with synthesis catalyst under synthesis conditions, separating a gas consisting chiefly of hydrogen, carbon dioxide and methane from synthesis conversion products, treating active catalyst with said last-named gas while the synthesis step is proceeding and subsequently employing catalyst thus treated by residual gas for effecting synthesis in the synthesis step.

JOSEPH K. ROBERTS.

REFERENCES CITED

The following references are of record in the file of this patent:

UNITED STATES PATENTS

| Number | Name | Date |
|---|---|---|
| 2,224,048 | Herbert | Dec. 3, 1940 |
| 2,244,196 | Herbert | June 3, 1941 |
| 2,417,164 | Huber, Jr. | Mar. 11, 1947 |